Dec. 28, 1965  A. MILLER  3,226,700
DATA STORAGE SYSTEM
Filed Nov. 22, 1960  8 Sheets-Sheet 1

ARMIN MILLER
*INVENTOR.*

BY

*Hehr and Swain*
ATTORNEYS

Dec. 28, 1965  A. MILLER  3,226,700

DATA STORAGE SYSTEM

Filed Nov. 22, 1960  8 Sheets-Sheet 2

ARMIN MILLER
*INVENTOR.*

BY
*Flehr and Swain*
ATTORNEYS

ARMIN MILLER
*INVENTOR.*

Dec. 28, 1965   A. MILLER   3,226,700
DATA STORAGE SYSTEM
Filed Nov. 22, 1960   8 Sheets-Sheet 5

ARMIN MILLER
*INVENTOR.*

BY
*Flehr and Swain*
ATTORNEYS

ARMIN MILLER
*INVENTOR.*

BY

*Lehr and Swain*
ATTORNEYS

TIMING — PARITY CHECK WRITE

ARMIN MILLER
*INVENTOR.*

BY
*Flehr and Swain*
ATTORNEYS

Dec. 28, 1965  A. MILLER  3,226,700
DATA STORAGE SYSTEM
Filed Nov. 22, 1960  8 Sheets-Sheet 8

ARMIN MILLER
*INVENTOR.*

BY
ATTORNEYS

3,226,700
DATA STORAGE SYSTEM
Armin Miller, 630 Berkeley Ave., Menlo Park, Calif.
Filed Nov. 22, 1960, Ser. No. 70,994
16 Claims. (Cl. 340—174.1)

This invention relates generally to a data storage system and method, and more particularly to a data storage system and method in which data is serially recorded in a single channel.

As is well known, data storage systems may receive information from a variety of input devices and supply the information to a variety of output devices. For example, input devices may include computers, electric typewriters, cash registers, accounting machines, measuring instruments, teletype, and the like. Output devices may include computers, typewriters, other data storage systems, accounting machines, teletype and the like.

Many types of data storage systems are presently in use. By way of example, the most commonly used systems are magnetic tape recording systems—tape, drum and disc, punched cards, punched paper tape, and magnetic core memory systems.

The input and output information rate varies considerably as can be surmised from the variety of input and output devices mentioned above. The information in certain instances may be supplied or received periodically, thus permitting the data storage system to be synchronized with the associated input or output device whereby operation is synchronous. On the other hand, the data may be supplied or accepted aperiodically whereby operation is asynchronous.

Data storage systems such as punch card and paper tape are suited for storing and supplying data at relatively slow rates. Data storage systems employing other recording media, such as a magnetic recording medium, can operate synchronously at relatively high speeds. When operated synchronously at low data rates, the packing density is, in general, relatively low. Systems of the latter type are relatively costly when adapted for asynchronous low data rates.

When an error is made in the information being supplied to data storage systems, it is desirable to provide means for correcting the error. In punch card systems, a new card is made up, discarding the old one. In paper tape systems, a new section of paper tape is formed and may be spliced onto the existing tape. Magnetic tape systems either do not include a means for correcting previous characters, or such means require relatively complicated control systems to provide indexing to the information to be corrected. In certain types of data recording, for example, non-return-to-zero, a single data character is difficult to correct.

Data storage systems of the prior art, such as magnetic tape, in general, employ a plurality of parallel tracks which have the information serially recorded thereon. A track is provided for each bit of information forming a character and additional tracks for parity checks, addressing, and the like. Each of these many tracks requires a separate recording head, amplifiers, and associated circuits. Thus, systems of the prior art are relatively complicated and expensive. Systems of this type are, in general, employed only in conjunction with large computers. They are not economically suitable for use with small computers and systems such as typewriter, teletype, accounting and the like.

It is a general object of the present invention to provide an improved data storage system and method.

It is another object of the present invention to provide a data storage system and method which can be employed with a variety of input and output devices.

It is another object of the present invention to provide a data recording and reproducing system which can be operated synchronously or asynchronously over a wide range of data rates.

It is another object of the present invention to provide a data recording system including relatively simple means for correcting errors in stored data.

It is another object of the present invention to provide a data recording system which includes a data channel and a reference channel having recorded thereon a single circulating marker which indexes the data channel.

It is another object of the present invention to provide a data storage system and method in which the data is stored serially on a single channel.

It is a further object of the present invention to provide a data storage system which is relatively simple and inexpensive to manufacture.

It is a further object of the present invention to provide a data storage system which can be employed for intermediate storage between a variety of input devices and a variety of output devices.

It is another object of the present invention to provide a data storage system and method in which the data is stored in a single continuous track on a recording medium.

It is another object of the present invention to provide a data storage system of the foregoing character in which the data is stored as remanent magnetism on a drum, belt or disc.

It is another object of the present invention to provide a data storage system including recorded clocking signals which permit the system logic to operate satisfactorily even though there may be speed variations in the recording medium.

The storage system of the present invention employs a cyclic memory, for example, a rotating recording medium, for storing the information. A single data channel is employed for serially recording and reproducing the data. The data channel cooperates with a transducer to form either a continuous track or a plurality of coaxial track portions.

Separate channels are provided to carry referencing control and clocking information. The reference channel provides a circulating mark which identifies the end of the data write or read sequence. The circulating mark may be used to control the recording and reproducing operation whereby there is no overlap or gap in the data. Appropriate provisions may be made for checking parity errors and for sensing other special conditions.

The foregoing and other objects of the invention will be more clearly understood with reference to the following description and corresponding drawings.

Referring to the drawing.

Figure 15:
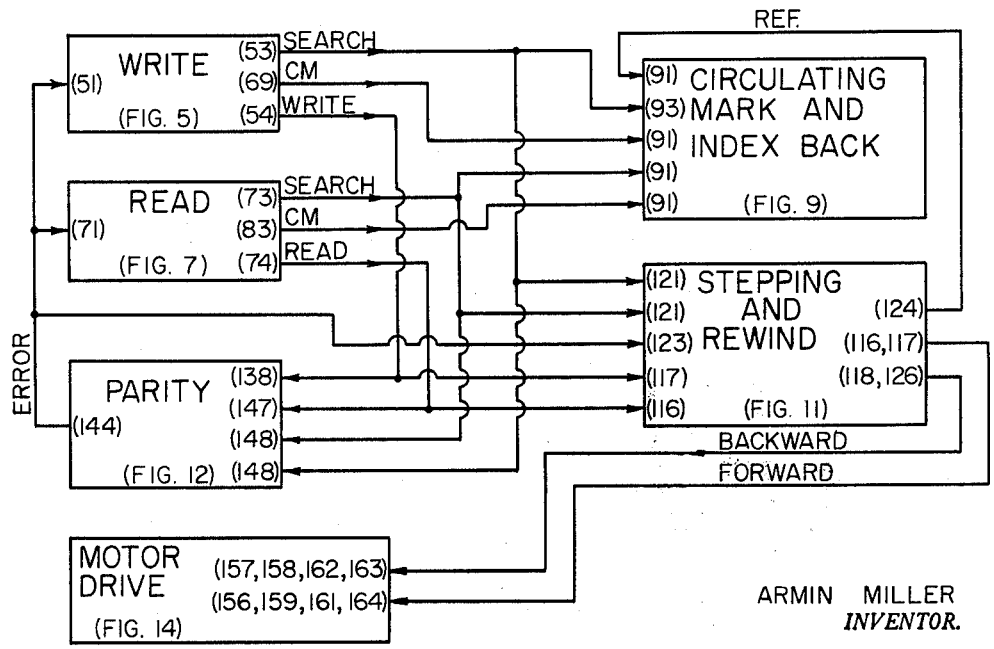
Figure 5:
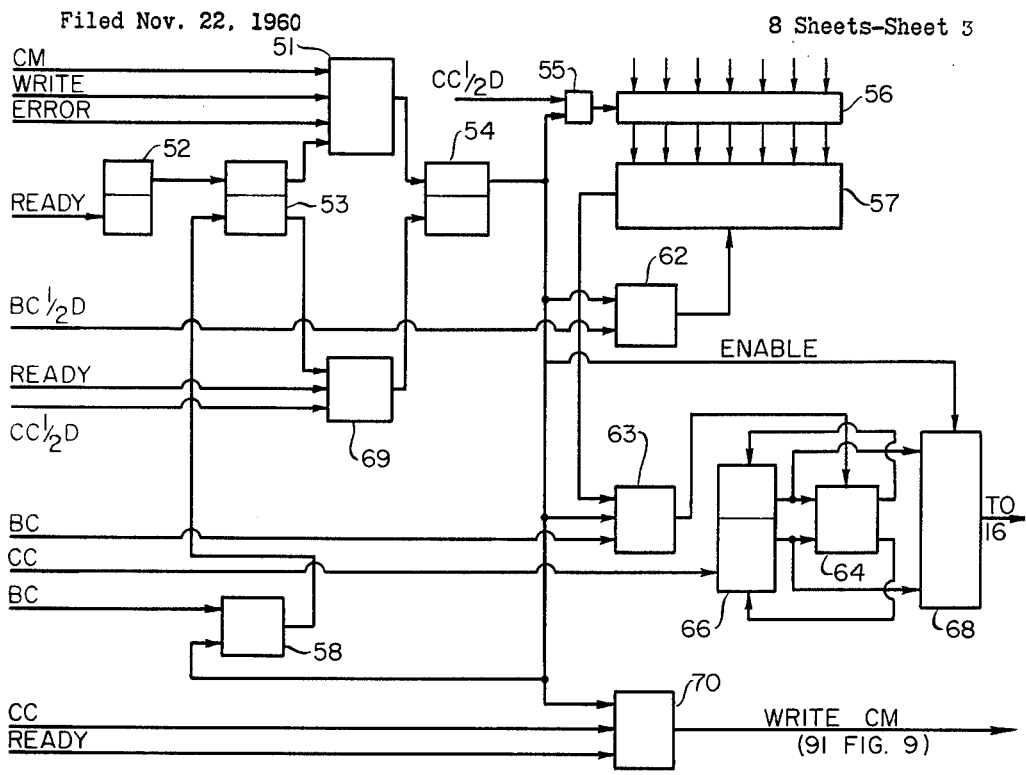
Figure 7:
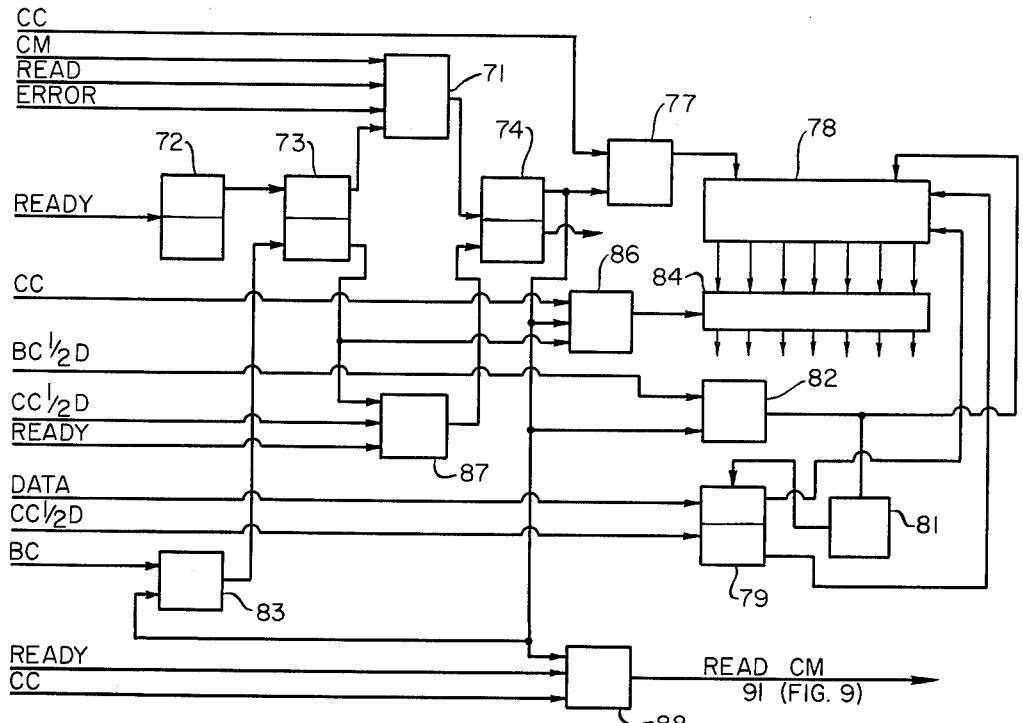
Figure 9:
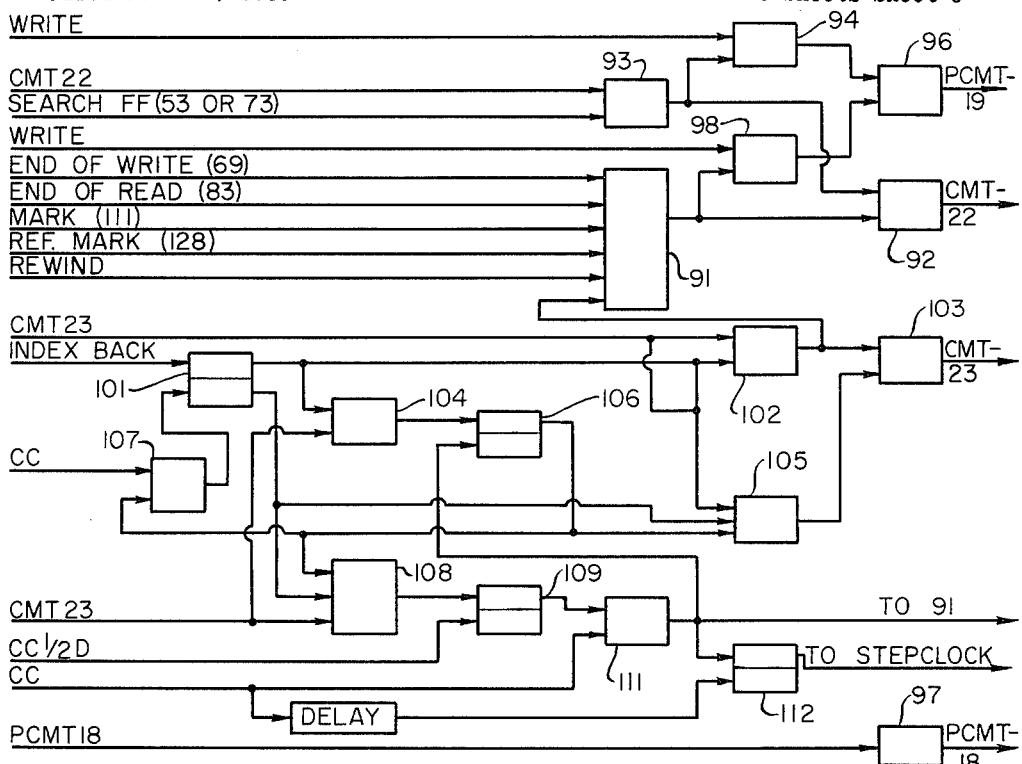
Figure 11:
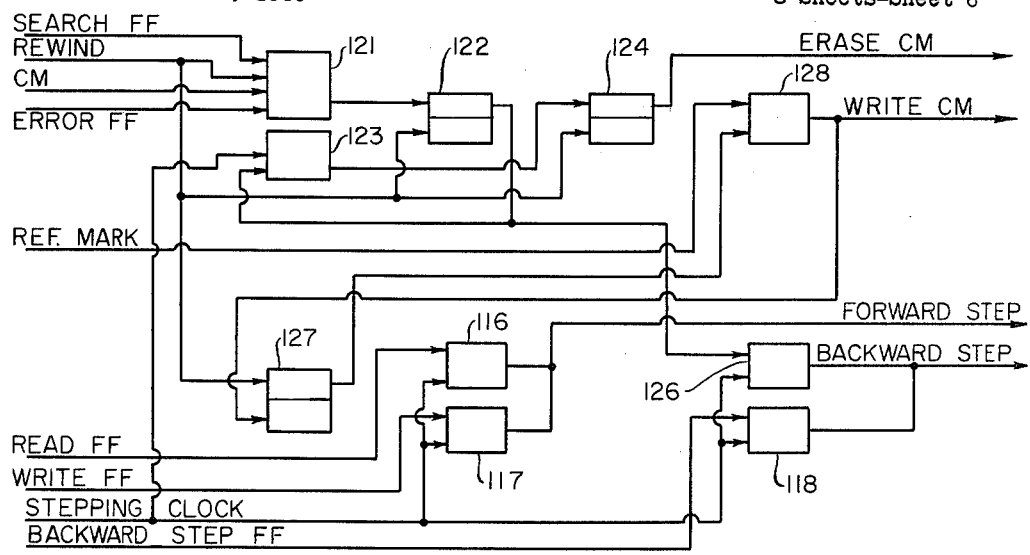
Figure 14:
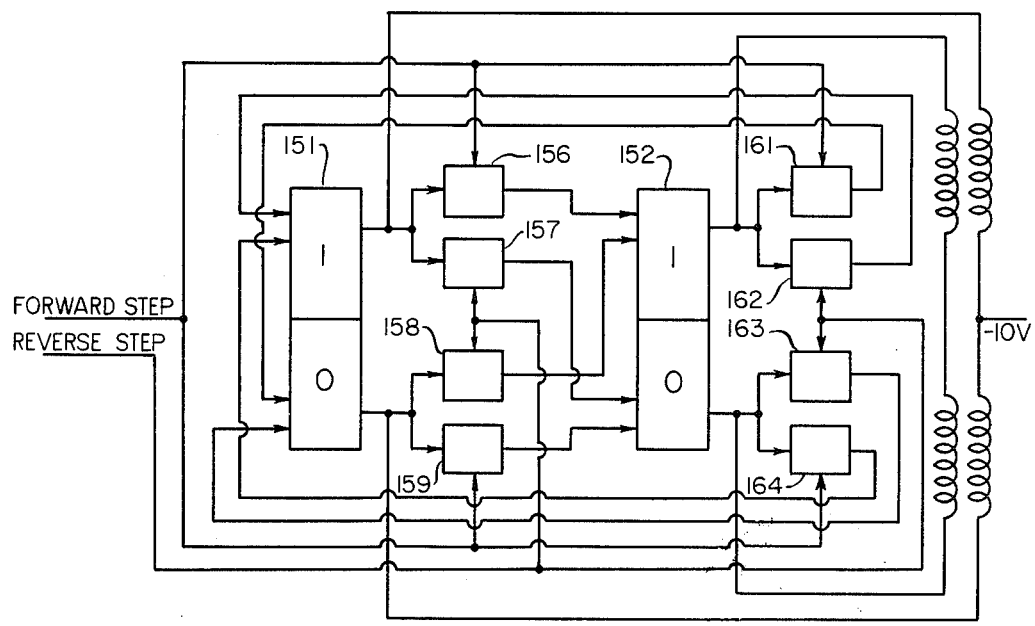
Figure 12:
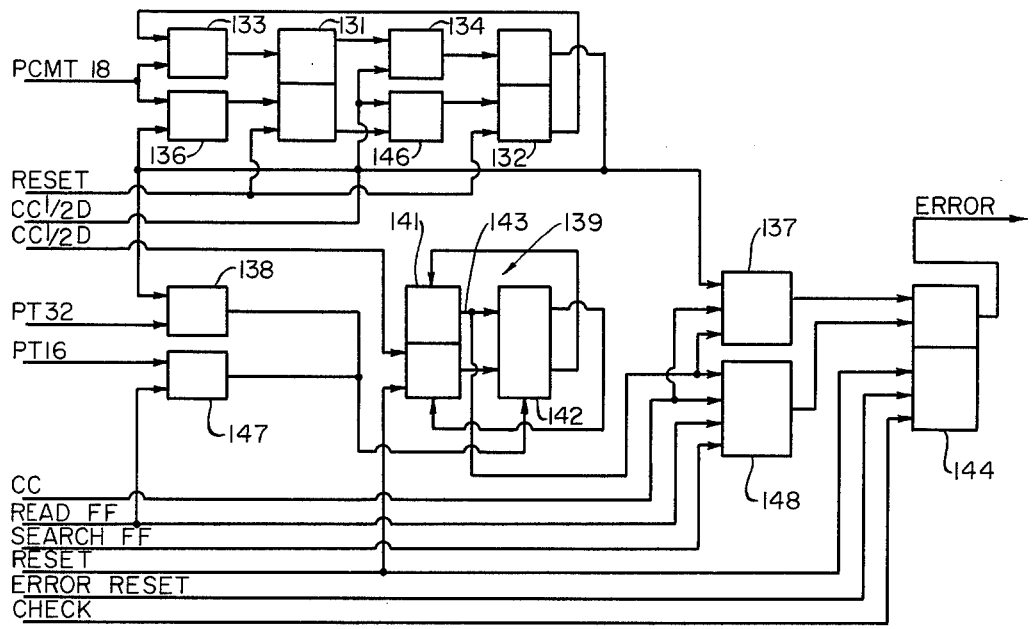
Figure 16:
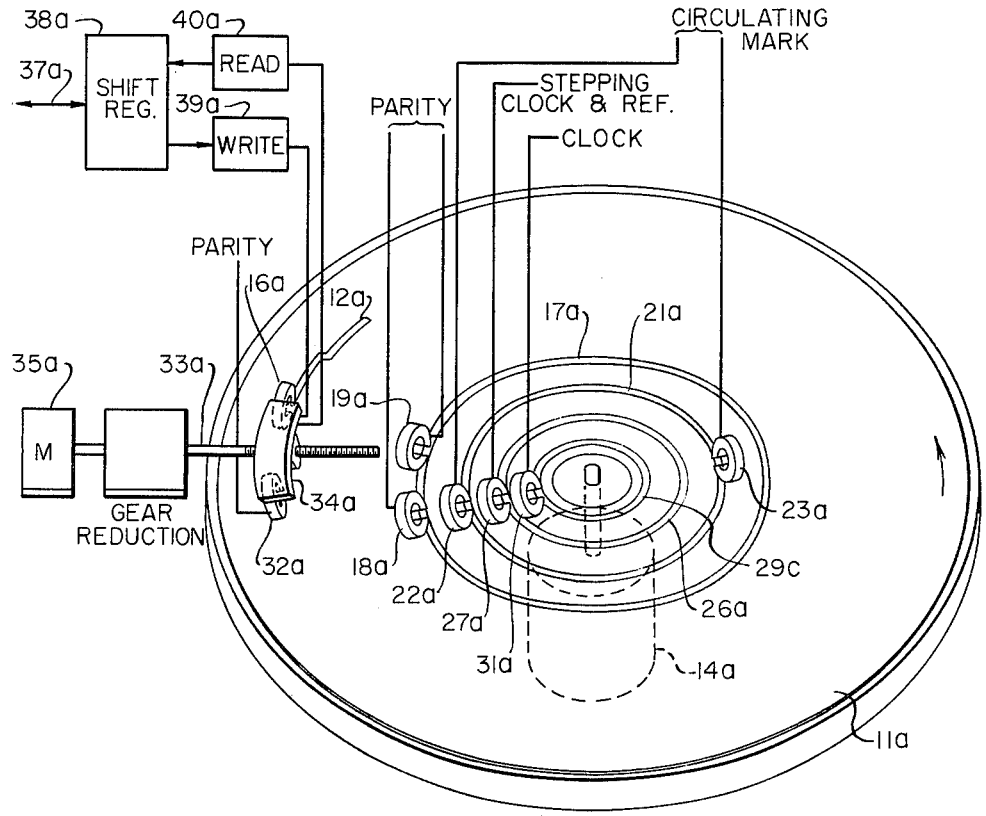
Figure 17:
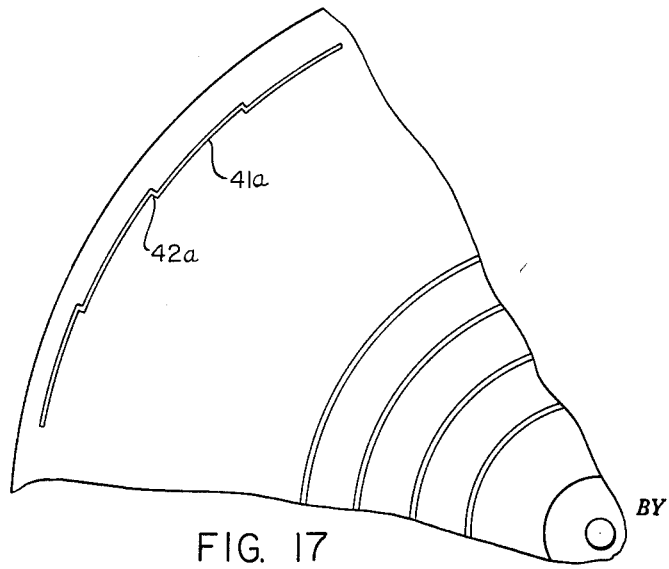

FIGURES 4A–H is a timing chart showing the clocking information, data, write and read currents and data characters;

FIGURE 5 is a schematic block diagram illustrating a suitable write circuit;

FIGURES 6A–I is a timing chart showing the operation of the write circuit;

FIGURE 7 is a schematic block diagram illustrating a suitable read circuit;

FIGURES 8A–H is a timing chart showing the operation of the read circuit;

FIGURE 9 is a schematic block diagram illustrating suitable circulating mark and index backward circuits;

FIGURES 10A–G is a timing chart showing the operation of index backwards;

FIGURE 11 is a schematic block diagram illustrating a suitable stepping and rewind circuit;

FIGURE 12 is a schematic block diagram illustrating a suitable parity check circuit;

FIGURE 13A–H is a timing chart showing the operation of the parity check circuit;

FIGURE 14 is a schematic block diagram of the stepping motor drive circuit;

FIGURE 15 is a block diagram schematically illustrating the relationship of the various circuits described above;

FIGURE 16 is a perspective view of disc type apparatus suitable for use in the system of the present invention; and FIGURE 17 illustrates the various tracks on the disc of FIGURE 16.

GENERAL DESCRIPTION

Figure 1:
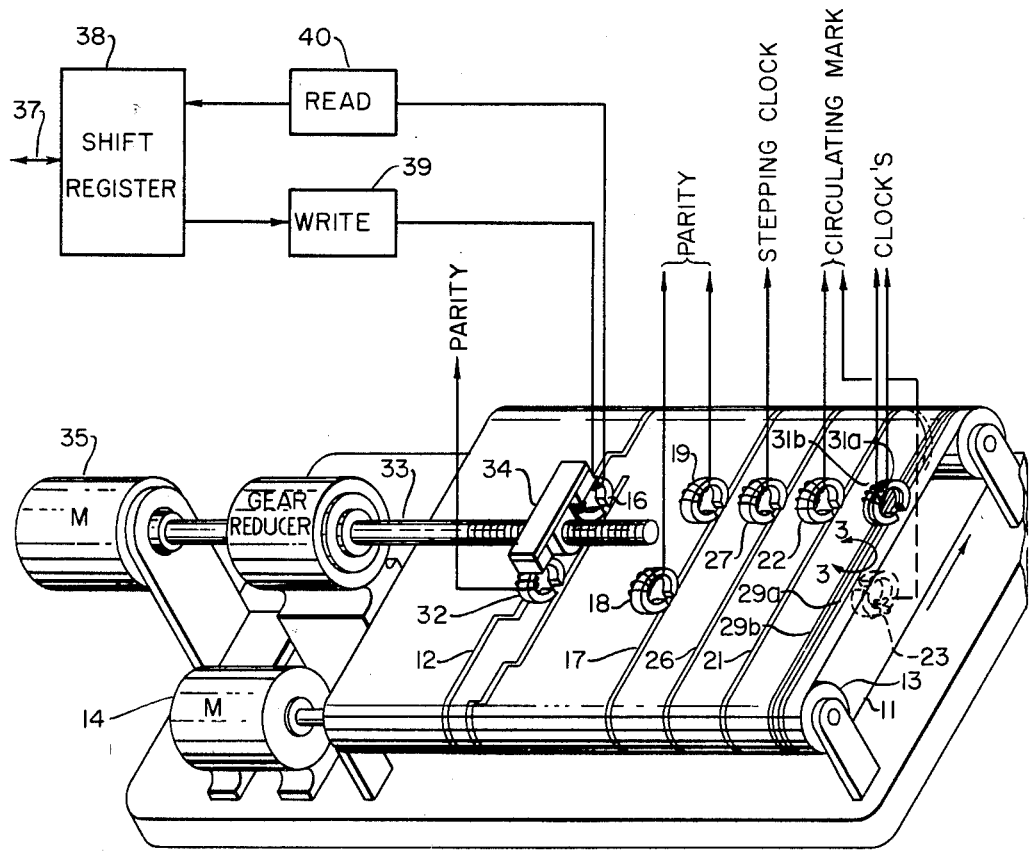
FIGURE 1 is a perspective view of apparatus suitable for use in the system of the present invention.

The data storage system employs a continuously rotating information storage media such as a magnetic belt 11, FIGURE 1, to store analog or digital data. A single channel of record and reproduce electronics may be employed for storing and recovering the data on the single record track 12. The recording medium is continuously driven as, for example, by a roller 13 driven by a motor 14. It will become apparent from the following description that the invention may be practiced with a disc, drum, or other type rotating recording medium. The invention may be practiced with other types of information storage media such as electrostatic, thermoplastic, semiconductive and the like. For purposes of explanation, the illustrative embodiment employs magnetic recording on a driven belt.

A data transducer 16 (DT16) cooperates with the record track 12 to selectively record or reproduce data. Additional tracks illustrated in FIGURE 1 comprise: (1) a parity circulating mark track 17 having parity circulating mark transducers 18 and 19 (PCMT18 and PCMT19) in cooperative relationship therewith; (2) a circulating mark track 21 having circulating mark transducers 22 and 23 (CMT22 and CMT23) in cooperative relationship therewith; (3) a stepping clock track 26 having a stepping transducer 27 (ST27) in cooperative relationship therewith; and (4) clock tracks 29a and 29b having clock transducers 31a and 31b (CT31a and CT31b) in cooperative relationship therewith. A parity transducer 32 (PT32) is disposed in cooperative relationship with the data track 12 and spaced along the track from the transducer 16 in the direction of movement of the recording medium.

Drive means is provided for moving the transducers DT16 and DT32 across the recording medium. The drive means illustrated comprise a lead screw 33 engaging the transducer mount 34 and a stepping motor 35 for intermittently rotating the screw to move the transducers in discrete steps. By moving the transducers in discrete steps, it is possible to form a track 12 which includes a plurality of coaxial circular portions 41 connected by steps 42. As the number of steps is increased, the track 12 will closely approximate a helix, FIGURES 1 and 2. If the information storage medium is a rotating disc, the plurality of coaxial circular portions 41 approximate a spiral, FIGURE 17.

Digital data is transferred to or accepted from associated equipment at the terminal 37 by shift register 38 which can supply or receive the information either serially or in parallel. The data is written onto the recording medium by transferring the same from the shift register 38 through write electronics 39 to the transducer DT16. For reproducing or recovering information, the transducer DT16 cooperates with the record track 12 to supply the information to the read electronics 40 which, in turn, supplies the data to the shift register 38 for transfer to associated equipment. Suitable circuits are included for controlling the transfer of data in both directions between the data storage system and associated equipment.

The parity circulating marker track 17 together with associated circuits, to be described, permits a parity check of digital information being recorded on track 12. Because of the physical difficulty of locating a reproduce head PT32 closely adjacent to the head DT16, it becomes necessary to provide means for commencing a parity check subsequent to the commencement of a write operation.

The track 17 and associated transducers PCMT18 and PCMT19 are provided for this purpose. As soon as a write operation is commenced, a mark is recorded on the parity circulating mark track 17 by the transducer PCMT19. The mark moves with the rotating medium and is then sensed by the transducer PCMT18. At the moment the transducer PCMT18 senses the mark, it provides a signal which starts a parity check of the information being recovered by the transducer PT32.

Circulating mark track 21 is adapted to have recorded thereon a single circulating mark at any one time. The mark identifies the end of the last data operation. The mark is recorded by transducer CMT22 and is precessed in the opposite direction to that of the rotating recording medium. Thus, if the operation was a write operation, the mark will index the end of the serially recorded information on the track 12. If the operation was a read operation, the mark will index the beginning of the next information which is to be read. When the circulating mark is sensed by the transducer CMT22, a signal is formed which starts a write or read operation to assure that the next data is appropriately serially read or written. The sensed mark is immediately erased whereby during operation there is no mark present.

Although a write or read command may be given while the rotating medium is in any position, the read or write operation is controlled to commence only when the circulating mark which identifies the end of the last read or write operation is sensed. Writing or reading then takes place at the appropriate point along the track 12.

The circulating marker track 21 includes a second transducer CMT23 which is employed in conjunction with the transducer CMT22 to precess the mark in the same direction as the direction of rotation of the magnetic member, whereas in the read or write operation, the mark, previously described, precesses in the opposite direction. By precessing the mark in the same direction as rotation of the member, it is possible to move the mark so that it indexes backward.

The stepping clock track 26 includes pre-recorded stepping information. The reproduced stepping information is employed with the stepping circuits to control operation of the motor 35 so that the heads are moved across the recording medium, as required, during recording, reproducing, index backward and rewind operations.

The clock tracks 29a and 29b provide timing information to time the various machine functions so that the read, write, rewind and other operations will commence at an appropriate point in time. The clock track is so arranged that changes in speed of the moving recording medium are automatically compensated.

To clarify the detailed description which will follow, a general description of each mode of operation is presented. The description is predicated on the use of the system to store digital data. It will, however, be apparent that the system can be used to store analog data as well.

The device, in general, has six modes of operation: (1) fast write; (2) fast read; (3) slow write; (4) slow read; (5) index backward; and (6) rewind.

GENERAL DESCRIPTION

*Fast write.*—In the fast write mode of operation, the data storage system receives data at a rate which is determined by the clock tracks 29. The data may come from a digital computer or other external device. The external equipment signals the data storage system that it is ready to transfer data. If the data storage system is not in an error state or a standby state, a ready signal is sent to the external equipment when the circulating mark in the track 21 is sensed.

As previously described, the circulating mark marks the end of the previously recorded serial data. It is at this point that the data storage system signals the associated equipment that it is ready to receive data. The external equipment transfers a character to the input register 38. When transfer of the character is completed, the character is serially shifted out of the register bit by bit and written serially onto the data track 12. At the end of a character, the device signals the external equipment that it is ready to accept the next character. The external equipment continues to send characters until it has completed its message. If an error occurs, the system completes the operation which is under way. It then stops operation until it receives instructions to proceed as, for example, from an operator. When the external device signals that it has completed transfer of a particular record or message, a new circulating mark is recorded in the circulating mark track to identify the end of the serially recorded data. When the external equipment again signals that it is ready and the circulating mark is sensed, data is transferred into and stored by the data storage system.

*Slow write.*—In this mode of operation, the device can receive data at an asynchronous rate. The information may, for example, come from a flexowriter. The external equipment signals the device that it is ready to transmit data. If the device is not in an error state or a standby state when the circulating mark is sensed, it signals the external equipment to transfer a character into the input register. The circulating mark is erased. Upon completion of the transfer, the data is serially shifted out of the register and serially written on the data track 12. When transfer of the character is completed, the device signals that it is ready to accept the next character from the external equipment. However, if the external equipment ready signal is not present, the system immediately records a circulating mark in the circulating mark track 21 to identify the end of the character. When the external equipment again signals that it is ready and the circulating mark is sensed, a character will be transferred from the external equipment into the shift register. The mark is erased on sensing. Although the external equipment is operating asynchronously, the information is closely packed in the data track 12. Each character is serially adjacent to the preceding character. This is achieved by recording the circulating mark to identify the end of previously recorded character and employing the circulating mark to start a write operation at the proper point in time.

*Fast read.*—In this mode of operation, the data storage system transfers stored data to associated equipment at a rate determined by the clock tracks 29. The data may be sent to a digital computer or other external synchronous device. The external equipment signals the data storage system that it is ready to accept data. If the data storage system is not in an error or a standby state, a character is transferred serially to the output register as soon as the circulating mark is sensed. It will be remembered that in this mode of operation the circulating mark identifies the end of previously read data (beginning of the new data to be read). When the register is filled, the data storage system signals the external equipment that a character is available to read. The external equipment continues to accept characters as long as its ready signal is present or until an error occurs, or the end of the data track 12 is sensed. The data storage system ceases to read and transfer data when the ready signal from the external equipment is not present. A mark is recorded in the circulating mark track 21 to identify the last read information when the ready signal from the external equipment is not present.

*Slow read.*—In this mode of operation, the device sends out information at an asynchronous rate. The information may be sent to a flexowriter or other slow device. The external equipment signals the device that it is ready to read. If the device is not in an error state or in standby, a character is transferred serially into the register when the mark is sensed. When the register is filled, the device signals the external equipment that a character is available. The device then waits for a ready signal from the external equipment before the next character is transferred to the output register. If, upon completion of a transfer of a character, the ready signal from the external equipment is not present, a mark is recorded on the circulating mark channel to identify the end of the previously read character and the beginning of the next character.

*Index backwards.*—During normal read or write operation, the circulating mark precesses in a direction opposite to the direction of rotation of the recording medium. Thus, if the recording medium rotates counterclockwise, the marker precesses clockwise. In order to re-read or re-write any character, it is necessary to move the mark one or more character lengths in the same direction as the rotation of the recording medium. The natural means of moving the mark is to read and erase, then write it again sometime later after a portion of the medium has passed. This causes counter-clockwise movement of the mark. For index backward, a means for moving the mark ahead of where it is being read is required.

In accordance with the present invention, this is done as follows: Two circulating mark read-write transducers or heads CMT22 and CMT23 are associated with the circulating mark track. These heads are separated by 180° minus ¾ character distance in degrees in the direction of rotation of the recording medium. When the transducer CMT23 senses the marker, it immediately erases the mark and transfers a mark signal to transducer CMT22. Transducer CMT22 writes a new mark. The mark has been moved 180° plus ¾ character in a clockwise direction. The recording medium then moves 180° minus ¾ character and the mark is again sensed and erased by transducer CMT23 and is stored in a memory circuit. The transducer CMT22 is now ¾ plus ¾ or 1.5 character degrees ahead of the original mark position along the medium and a mark signal is temporarily stored. The mark signal is transferred to and recorded by transducer CMT22 in response to a character clock signal so that it is moved forward exactly one character length. The recording medium may undergo as much as one complete revolution during the transfer process. The circulating mark has been moved back and marks the end of the previous character.

*Rewind.*—The rewind may be initiated when the data transducer is at any position on the belt. Provision is made to reset the circulating mark to a starting position. For example, if some portion of the belt is written and a rewind instruction is given, the marker must identify the first recorded character. When the rewind is initiated, the mark in the circulating track is erased since the mark on the track is probably not in the correct position relative to the first character on the belt. When the transducer is moved transversely of the recording medium and reaches the beginning of the recording medium, a reference mark is transferred to the circulating mark track to mark the first character.

Figure 2:
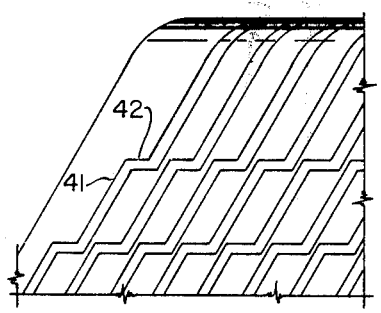
FIGURE 2 is an enlarged view illustrating the data track.
Figure 3:
FIGURE 3 is an enlarged view illustrating the clocking tracks.

*Stepping.*—Preferably, the information is recorded along a continuous track. In a system of the type described, the transducer is moved transverse to the direction of rotation of the recording medium to provide a helix or spiral track. Movement of the transducer is in discrete small steps. Referring to FIGURE 2, a helical data track such as would be formed on a belt or drum is illustrated. It includes coaxial circular track portions 41 and step portions 42. In FIGURE 17, a spiral data track such as would be formed on a disc with apparatus of the type shown in FIGURE 16 iss illustrated. It also includes coaxial circular track portions 41a and step portions 42a. Information can be recorded along the step portion 42a as well as the circular track portion 41a.

The data transducer DT16 moves a step whenever the read device is reading or writing and a pre-recorded stepping mark is sensed. It is noted that the steps are aligned longitudinally on the belt or drum and radially on the disc. Since stepping is controlled by pre-recorded marks in the stepping track, the steps occur at the same place for the case of index backward. A reverse step occurs whenever the index backward instruction is present and a stepping marker is sensed. In this way, the read-write transducer DT16 accurately tracks the data track 12 regardless of the programming of the data system.

*Parity check.*—The data storage system is inhibited from further operation and requires a manual or automatic reset if a parity check shows an error. The data storage system is also inhibited when the end of the recording medium is sensed.

During write, a parity check is performed by reading after writing. In order to provide read after write parity checking, three additional magnetic heads are provided in the system illustrated. A transducer PT32 is located behind the write transducer on the information track a distance sufficient to keep cross-talk at an acceptable level.

Checking begins at the same point on the data track that the writing began. Since the circulating mark has been erased before the read transducer 32 senses the data, a parity mark channel is provided to receive a parity circulating mark. The sequence of operation is as follows. A write instruction is given. The circulating mark is sensed and erased, and writing is initiated. At the same time, a parity circulating mark is transferred to the parity circulating mark track by the parity circulating mark transducer PCMT19. Parity checking does not begin until the parity mark is sensed by the second parity circulating mark transducer PCMT18 which is spaced from the transducer PCMT19 a distance corresponding to the spacing of transducer PT32 from transducer DT16. The transducer PT32 on the information track is then over the beginning of the first character of the written data. The parity circulating mark is erased as soon as it is sensed. A parity check is commenced.

Each time a mark is sensed or written in the circulating mark track during a write operation, it is also written in the parity mark track. Also, each time the mark is sensed in the parity mark track, it is erased. Parity is checked during a read operation by employing the output of DT16 directly. The parity circulating mark track and associated transducers and circuits are not used.

An end of recording medium warning is provided so that reading or writing is not attempted after the end of the recording medium is reached. However, provision may be made for completing a recording after the warning is given.

DETAILED DESCRIPTION

The system is described with respect to the non-return-to-zero (NRZ) method of digital recording. In the NRZ method, no fixed state of magnetization is assigned to either (1) or (0). The state of magnetization is reversed each time the digit (1) is recorded, and remains unchanged for the digit (0). It will, however, be apparent that the data storage system of the present invention can be employed with other recording methods both digital and analog.

Figure 4:
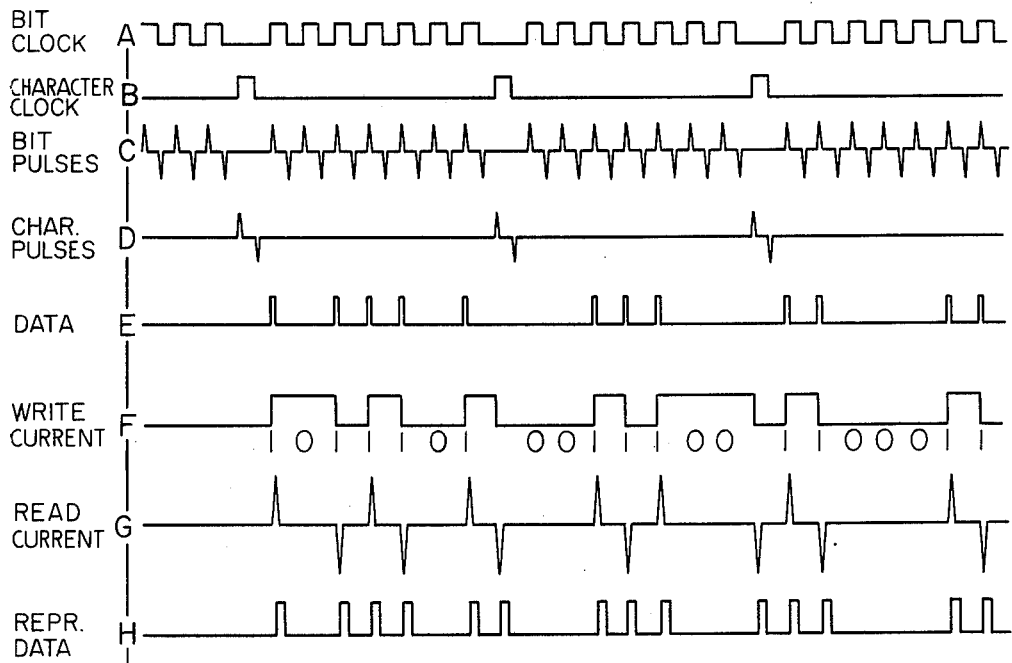

In FIGURES 4A–H, there is presented a timing chart illustrating storage and read-out of data. Clock information is carried by master clock tracks as illustrated in FIGURES 4A and 4B which show a bit clock track and a character clock track. The bit clock track has recorded thereon seven bit pulses for each character identified in the character clock track by a single pulse. The bit and character pulses are one-half bit in duration. During reproduction, the output of the heads associated with the bit and character clock will be as shown in FIGURES 4C and 4D, respectively. It will be observed that there are positive and negative going current pulses with the negative pulses delayed one-half bit with respect to the positive pulses. The pulses are employed to control operations as will be presently described.

Typical digital information consisting of three characters is illustrated in FIGURE 4E. The current which flows in the transducer DT16 (employing the NRZ method of digital recording) for the characters shown is illustrated in FIGURE 4F. The state of magnetization of the recording medium is the same as the current showing in FIGURE 4F. The curve shown in FIGURE 4G also represents the current flowing in the head or transducer DT16 or PT32 during a read operation. As is well known, the state of magnetization of the recording medium changes when there is a change of flux. This occurs whenever the current in the transducer changes during a write operation. Similarly, the read head will give an output when there is a change in flux. Thus, each output pulse generated by the read transducer DT16 represents hte digit (1). It is apparent that for a change of current in the opposite direction, the polarity of the pulse will be opposite. The processed output pulses are shown in FIGURE 6H. They are derived by peak sensing amplifier circuits associated with the read transducer DT16.

Each character illustrated includes seven bits. The character clocks are eight bits apart. The first bit is employed to establish the sense of magnetization at the beginning of each character. In the present system, the current (state of magnetization) is always in the same sense following a character clock. This makes its possible to step backward and correct or erase previous information character by character. It will be apparent to one versed in the art that the system can be used for characters having more or less bits of information by choosing an appropriate clocking track and associated circuits.

Figure 6:
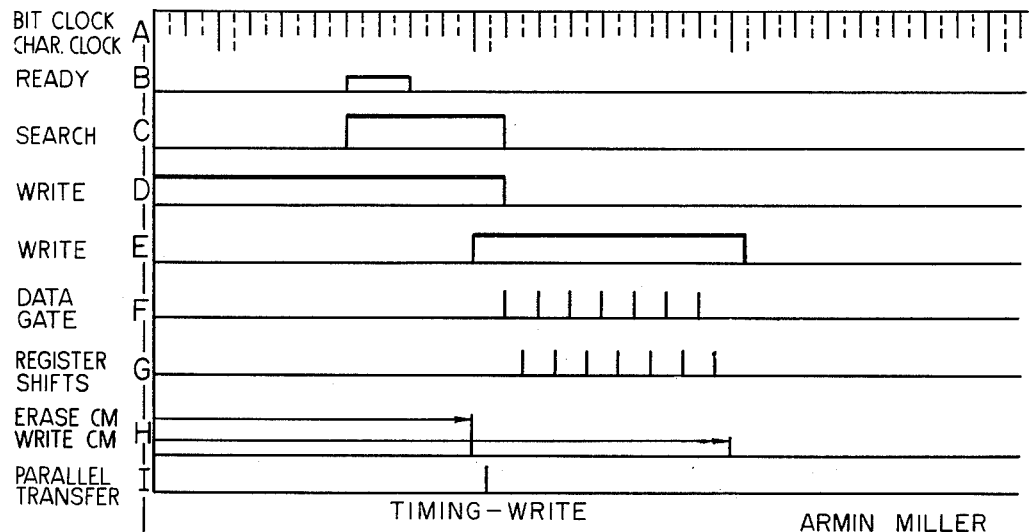

*Write circuits and operation.*—FIGURE 5 is a block diagram of suitable write circuitry, and FIGURE 6 is a timing chart illustrating the timing of the operation of the write circuits.

The write instruction is given by a signal, FIGURE 6D. For example, the signal may be a voltage obtained by manually depressing a control switch. The write signal is applied to a gate 51. As soon as associated equipment, for example, a computer or flexowriter is ready, it transmits a ready signal, FIGURE 6B, to a one-shot multivibrator 52. The multivibrator undergoes one cycle of operation and develops an output pulse which sets a search flip-flop 53. Setting of the search flip-flop 53 applies a set signal, FIGURE 6C, to the gate 51. When a circulating marker is sensed by the circulating mark transducer CMT22, an output pulse is formed, FIGURE 6H, and the mark is immediately erased as will be presently described. This pulse is also applied to the gate 51. The gate is also connected to receive error signals from the parity check circuit to be presently described. The gate 51 is such that it will form an output signal when there is no error signal (error) and a circulating mark (CM) signal is applied, a search signal from the search flip-flop is present (search), and a write signal or instruction is present (write). The output signal from the gate serves to set the write flip-flop (write FF) 54. The foregoing can be represented by the logic equation:

$$(\text{write FF})_{set} = (\text{search})_{set}(CM)\text{ write }(\overline{\text{error}}) \quad (1)$$

When the write flip-flop 54 is set, a set signal is applied to various associated circuits for controlling operation of the same. This signal is applied to a gate 55 which also receives character clock information. The gate 55 develops an output signal when the write flip-flop is set and a character clock delayed one-half bit (CC½D) is present. The output signal, FIGURE 6I, from the gate 55 is applied to the parallel transfer gate 56 to transfer data from the associated equipment into the shift register 57.

$$\text{Parallel Transfer} = (\text{write FF})_{set}(CC\tfrac{1}{2}D) \quad (2)$$

Thus, data is transferred into the shift register each time a character clock occurs and the write flip-flop is set.

A set signal is also applied from the write flip-flop to the reset gate 58. Bit clock (BC) pulses are also applied to the reset gate 58. Upon application of signals from the write flip-flop and a bit clock, the reset gate transmits a signal to the search flip-flop to reset it, FIGURE 6C.

$$\text{Reset Search} = (BC)(\text{write FF})_{set} \quad (3)$$

The set signal from the write flip-flop 54 is also applied to the shift gate 62 which is connected to receive one-half bit delayed clocking information. Each time a bit clock plus one-half delay (BC½D) occurs and the write flip-flop is in the set position, the data in the shift register is shifted one bit at a time, FIGURE 6G.

$$\text{Register Shifts} = (\text{write FF})_{set}(BC\tfrac{1}{2}D) \quad (4)$$

A write data gate 63 passes the digital information to th recording NRZ circuits upon application of a bit clock (BC) and a set signal from the write flip-fiop 54. FIGURE 6F represents operation of the gate to pass data.

$$\text{Write Gate Open} = (\text{write FF})_{set}(BC) \quad (5)$$

The data from gate 63 is applied to a steering circuit 64 which controls the operation of the NRZ flip-flop 66.

At character clock, the non-return-to-zero flip-flop 66 is reset. Thus, each character that is written will start with the same magnetic polarity. The character clock in essence provides a fix-up pulse which is ignored during read and parity check.

The output of the NRZ flip-flop is applied to a write drive amplifier 68 which serves to provide write current, FIGURE 4F, to the transducer DT16. The write drive amplifier 68 is enabled when the write flip-flop 54 is set.

A reset gate 69 controls resetting of the write flip-flop 54. A reset signal is applied to the flip-flop 54 from gate 69 when there is no ready signal, FIGURE 6B, the search flip-flop 53 is reset, FIGURE 6C, and a character clock plus one-half bit delay is applied.

$$(\text{write FF})_{reset} = \overline{(\text{ready})}(\text{search})_{reset}(CC\tfrac{1}{2}D) \quad (6)$$

Circulating marker gate 70 develops a circulating mark signal (CM), FIGURE 6H, when the write flip-flop 54 is set, a ready signal is not present and the character clock occurs.

$$CM = (\text{write FF})_{set}\overline{(\text{ready})}(CC) \quad (7)$$

The shift register 51 is reset at each character clock (CC).

Figure 8:
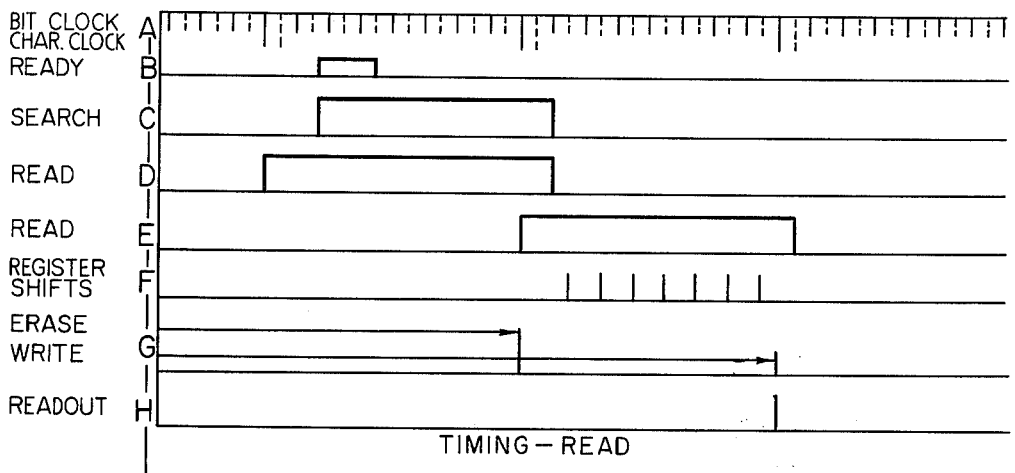

*Read circuits and operation.*—FIGURE 7 is a block diagram of suitable read circuitry, and FIGURE 8 is a timing chart illustrating the timing of the operation of the read circuit.

A read instruction is given by a read signal, FIGURE 8D. For example, the voltage may be obtained by manually depressing a control switch. The read signal is transmitted to a gate 71. As soon as the associated equipment, for example, the computer or flexowriter is ready, it transmits a ready signal, FIGURE 8B, to a one-shot multivibrator 72. The multivibrator undergoes one cycle of operation to develop an output pulse which sets the search flip-flop 73, FIGURE 8C. When a circulating mark (CM) is sensed by the transducer CMT22, an output pulse is formed, FIGURE 8G, and the mark is immediately erased as will be presently described. This pulse is also applied to the gate 71. The gate is also connected to receive an error signal from a parity check circuit, to be presently described. The gate 71 is such that it will form an output signal when no error signal is present $\overline{(\text{error})}$, a circulating mark signal is present (CM), a search signal from the set search flip-flop 73 is present (search) set, and a read signal (read) is present. The output signal from the gate sets the read flip-flop 74, FIGURE 8E.

$$(\text{Read FF})_{set} = \overline{(\text{error})}(CM)(\text{search})_{set}(\text{read}) \quad (8)$$

When the read flip-flop 74 is set, a signal is applied to various associated circuits for controlling the read operation. A signal is applied to the gate 77 which is also connected to receive character clock information. It develops an output signal when the read flip-flop is set and a clock (CC) occurs. The output of the gate 77 is employed to reset the shift register 78. Thus, the shift register is reset upon the occurrence of character clock.

$$\text{Reset Shift Register} = (\text{read FF})_{set}(CC) \quad (9)$$

A peak sensing flip-flop 79 receives the reproduced data from transducer DT16 and provides input information to the shift register 78. The peak sensing flip-flop 79 is reset at each character clock, delayed by one-half bit (CC½D). This prevents the fix-up bit previously described from transmitting an erroneous signal to the shift register.

Each time a flux change is sensed by the read head, the peak sensing flip-flop is set to indicate the digit (1). The peak sensing flip-flop 79 is reset by reset circuit 81 at each bit clock plus one-half bit delay (BC½D). The gate 82 provides output signals upon application of bit clock plus one-half bit delay (BC½D) and a set signal from the read flip-flop.

$$(\text{Peak Sensing FF})_{reset} = (BC\tfrac{1}{2}D)(\text{read FF})_{set} \quad (10)$$

The signals from the gate 82 are also employed to shift the information into the shift register 78. The output of the gate is schematically illustrated, FIGURE 8F.

The peak sensing flip-flop may be considered part of a shift register. The first bit of information may set this flip-flop as early as a character clock plus one-half bit delay (CC½D) and as late as the first bit clock plus one-half bit delay (BC½D). The information waits in the peak sensing flip-flop 79 until the bit clock plus one-half delay and is then shifted into the shift register 78.

The search flip-flop 73 is reset when the read flip-flop 74 is set and the next bit clock (BC) occurs. An output signal from the gate 83 resets the search flip-flop 73.

$$(\text{Search FF})_{reset} = (BC)(\text{Read FF})_{set} \quad (11)$$

Information is transferred out of the shift register by the parallel register gate 84 at the occurrence of each character clock (CC) if the search flip-flop is reset and the read flip-flop is set. For this purpose, signals are applied to the gate 86 which serves to derive a read-out signal, FIGURE 8H.

$$\text{Parallel transfer} = (\text{Search FF})_{reset}(\text{Read FF})_{set}(CC) \quad (12)$$

The decision to write a single character, to read a single character, or a group of characters is controlled by the ready line of associated equipment. Thus, the computer ready line is applied to gate 87 which also has applied thereto character clock plus one-half bit delay and a reset signal from the search flip-flop 73. When the reset signal and character clock plus one-half bit delay (CC½D) are present and the computer ready line is not present, a signal is passed by the gate 87 to reset the read flip-flop 74.

$$(\text{Read FF})_{reset} = (\text{Search FF})_{reset}(CC\tfrac{1}{2}D)\overline{(\text{Ready})} \quad (13)$$

Circulating mark gate 88 forms a circulating mark signal (CM), FIGURE 8G; when the read flip-flop is set, a ready line is not present and character clock occurs.

$$CM = (\text{Read FF})_{set}\overline{(\text{Ready})}(CC) \quad (14)$$

Figure 10:
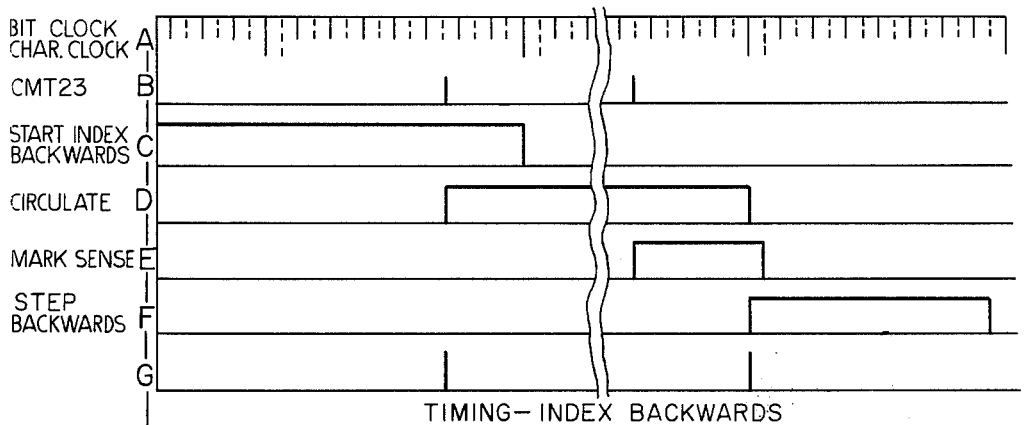

*Circulating mark and index back circuits and operation.*—FIGURE 9 is a block diagram of suitable circuitry for circulating mark operation during read, write and parity, and for indexing backward. FIGURE 10 is a timing chart illustrating the timing of the operation of the circuit illustrated in FIGURE 9.

As previously described, at the end of a write or read operation, a circulating mark is recorded in the circulating mark channel to identify the end of written data or the end of data which has been read. A circulating mark gate 91 controls the application of the mark to the drive amplifier 92 which drives the transducer (CMT22). At the end of a write or read operation, a signal is applied to the gate 91 from the gates 70 or 88, respectively, and is passed to the drive amplifier 92 to record a pulse on the circulating mark track.

As described, a parity check is carried out duirng a write or read operation. At the start of a write operation, the circulating mark identifying the end of the previous written information and the start of the next information is employed to record a mark in the parity circulating mark channel to index the information being transferred onto the data channel or track 12. This is necessary since the circulating mark is erased immediately after it is read from the circulating mark channel. Thus, during the write or read operation, there is no mark on the circulating mark channel 21.

When the transducer CMT22 detects a circulating mark, a circulating mark signal is transmitted to the parity gate 93. A set signal from the search flip-flop (53 or 73) is also applied to the gate 93. When the search flip-flop is set and a circulating mark signal is transmitted, the parity gate 93 forms an output signal. The output signal is employed to develop a signal which erases the circulating mark. The signal is also applied to a gate 94 which forms an output signal if a write instruction is present. This signal is applied to the driver 96 which drives the parity circulating mark transducer PCMT19.

Parity Mark = (CM) (Write) (Search FF)$_{set}$ (15)

As previously described, the moment the circulating mark is read by transducer CMT22, it is erased. The erase signal is formed when a search signal from the set search flip-flop 53, FIGURE 5, is present and the circulating mark is read by head CMT22.

Erase Circulating Mark = (search)$_{set}$ (CM) (16)

The signals are applied to the gate 93 which serves to form an output pulse which is applied to the driver 92 to erase the circulating mark. The same set of circumstances controls erase of the circulating mark during a read operation. The search signal is derived from the search flip-flop 73.

When PCMT18 reads the mark laid down by PCMT19, a parity check operation commences. Simultaneously, an erase signal is applied to PCMT18 to erase the parity circulating mark. The signal is preferably applied through a driver 97 for this purpose.

As previously described, at the completion of a recording operation, a circulating mark is applied to the gate 91 from the gate 70, FIGURE 5. The circulating mark signal passes to the drive amplifier 92 where a circulating mark is recorded by CMT22. The circulating mark signal is also applied to gate 98. The gate 98 also receives write instruction signals. The gate 98 forms an output pulse when there is an output applied from the gate 91 and there is a write signal present. The pulse is applied to PCMT19 which records a mark on the parity circulating mark channel.

Parity Circulating Mark = (write) (CM) (17)

When the next parity circulating mark is sensed by PCMT18, the parity check operation is terminated and the parity circulating mark is erased. Thus, the parity check operation ends at the same delay following completion of a write operation as the delay following start of a write operation.

The present data storage system includes means for indexing backwards to correct previously recorded data. Index back logic is provided for this purpose and serves to precess the circulating mark in the same direction as the direction of rotation of the recording medium.

The index backward command is applied to the system and this serves to set the index backward flip-flop 101; this is represented in FIGURE 10C. Setting of the flip-flop applies a set signal to the gate 102. As soon as head CMT23 reads the circulating mark, FIGURE 10B, the gate 102 forms an output signal which is applied to the head drive 103 to erase the circulating mark from the circulating mark track at head CMT23.

Erase Circulating Mark (CMT23) = (Set Index
        Back FF) (CM from CMT 23) (18)

The signal from the index back flip-flop 101 is applied to gate 102. When circulating mark transducer CMT23 detects the mark, it also applies a circulating mark signal to the gate 102. The gate 102 forms an output signal which is applied to gate 91. The gate 91 forms a signal which is applied to drive amplifier 92 which drives the transducer CMT22.

Write CM (CMT22) = (CM from CMT23)
        (Index Back FF)$_{set}$ (19)

Thus, the mark has been moved 180° plus ¾ character distance in the same direction as the direction of rotation of the recording medium. With the index back flip-flop 101 set, a signal is applied to the gate 104. The gate 104 serves to provide an output circulating mark signal the moment that the head CMT23 senses the mark and index back flip-flop applies a set signal. The output signal from gate 104 is applied to the circulating mark flip-flop 106 to set it, FIGURE 10D.

(Circulating Mark FF)$_{set}$ = (Index Back FF)$_{set}$
        (CM from CMT23) (20)

Setting of the circulating mark flip-flop 106 applies a set signal to the gate 107 which will form an output signal to reset the index back flip-flop 101 at the occurrence of the next character clock.

(Index Back FF)$_{reset}$ = (Circulating Mark FF)$_{set}$ (CC) (21)

When the index back flip-flop is reset, the reset signal is applied to the gate 108. A set signal is also applied to the gate 108 when the circulating mark flip-flop 106 is set and a signal is applied when the circulating mark is read by CMT23. Upon simultaneous application of these three signals to gate 108, a signal is passed to set the mark sense flip-flop 109 which serves to store the information for a predetermined short time, FIGURE 10E.

(Mark Sense FF)$_{set}$ = (Index Back FF)$_{reset}$
        (Circulating Mark FF)$_{set}$ (CM from CMT23) (22)

An erase signal is applied from the gate 105 to the transducer CMT23 when the index back flip-flop 101 is reset, the circulating flip-flop 106 is set, and the circulating mark is detected.

Erase CM(CMT23) = (Index Back FF)$_{reset}$
        (CM at CMT23) (Circulating Mark FF)$_{set}$ (22a)

Circulating mark information is stored until it is released from the mark sense flip-flop. Setting of the flip-flop 109 applies a set signal to the gate 111. A circulating mark is formed upon occurrence of the next character clock (CC) and is applied to the gate 91 for transmission to CMT22 for writing.

(Write New CM) = (Mark Sense FF)$_{set}$ (CC) (23)

It is observed that by delaying the pulses until the occurrence of the character clock, the pulse is exactly located by the character clock to precess a distance corresponding exactly to one character in the direction of rotation of the medium.

Mark sense flip-flop 109 is then reset at character clock plus one-half bit delay. The mark sense signal is also employed to reset the circulating mark flip-flop 106 and to set the backward step flip-flop 112. The backward step flip-flop stays on for approximately one character time and is then reset by delayed character clock, FIGURE 10F.

*Stepping and rewind circuits and operaion.*—During normal operation, the heads are stepped forward periodically as long as the apparatus is reading or writing. When the read flip-flop 74, FIGURE 7, is set, it applies a set or read signal to the gate 116 (FIGURE 11). As soon as a stepping clock is read by stepping transducer ST27, a signal is applied to the gate 116. When both the signal from the read flip-flop and a stepping clock are present, a forward step signal is applied to the stepping motor drive, FIGURE 14.

Forward Step=(Read FF)$_{set}$ (Stepping Clock)  (24)

When the write flip-flop 54, FIGURE 5, is set, it applies a write signal to the gate 117. Upon application of a stepping clock, a forward step signal is generated and applied to the stepping motor drive, FIGURE 14.

Forward Step=(Write FF)$_{set}$ (Stepping Clock)  (25)

As described above, there is provision for stepping back. It is apparent that not only must there be provision for electronically stepping back along a track, but also for physically moving the transducing head so that it coincides with the track at all times, taking a backward step at each place a forward step had previously occurred. This is achieved by applying a signal from the backward step flip-flop, FIGURE 9, to the gate 118. Upon application of a signal from the backward step flip-flop and a stepping clock, a backward step signal is formed which is applied to the stepping motor drive, FIGURE 14.

(Backward Step)=(Backward Step FF)$_{set}$ (Stepping Clock)  (26)

During the rewind operation, which can occur at the end of a recording or any time during a recording, means are provided for backward stepping so that the stepping occurs at the same point as the forward step. Means are also provided for assuring that the rewind does not occur until completion of a write, read or indexing operation.

For this purpose, a coincident gate 121 has applied thereto signals derived from various portions of the system. Gate 121 has applied thereto a signal from the search flip-flop 53 or 73 of the write or read module. It has applied thereto a signal from the rewind control, which may be manual or automatic. It has applied thereto a signal from transducer CMT22. It also has applied thereto signals from the error circuit. If the signals at the input of the gate 121 show that the search flip-flop is reset, that the rewind command is present, that a circulating mark is detected, and that the error flip-flop is reset, a signal is generated to set the rewind step flip-flop circuit 122.

(Rewind Step FF)=(Rewind Signal)
(Search FF)$_{reset}$ $\overline{(Error)}$ (CM)  (27)

With the flip-flop 122 set, an output signal is applied to the gate 123. The gate is also connected to receive a stepping clock. With the presence of a set signal from the flip-flop 122 and a stepping clock, a rewind sense signal is applied to the rewind sense flip-fop 124.

(Rewind Sense FF)$_{set}$=(Rewind Step FF)$_{set}$
(Stepping Clock)  (28)

The set signal from the rewind sense flip-flop 124 is applied to head CMT22 to erase the circulating mark.

(Erase CM)=(Rewind Sense FF)$_{set}$  (29)

A set signal from the rewind step flip-flop is also applied to a gate 126 which forms a backward step signal when there is supplied thereto a set signal from the rewind step flip-flop 122 and a stepping clock.

Backward Step=(Rewind Step FF)$_{set}$
(Stepping Clock)  (30)

Upon completion of a rewind operation, it is necessary to re-record a circulating mark in a circulating mark channel 21 since none is present. Upon completion of a rewind, a signal is applied to the rewind mark sense flip-flop 127. The signal can, for example, be derived by the head carriage striking a switch, or the like. A set signal from the flip-flop 127 is applied to the gate 128. As soon as a specially recorded reference mark on the stepping channel is detected, it is applied to the gate 128 which forms a circulating mark signal which is written by head CMT22 on the circulating mark channel.

Circulating Mark=(Rewind Mark Sense FF)$_{set}$
(Reference Mark)  (31)

The output of the gate 128 is also employed to reset the rewind sense flip-flop 127.

Figure 13:
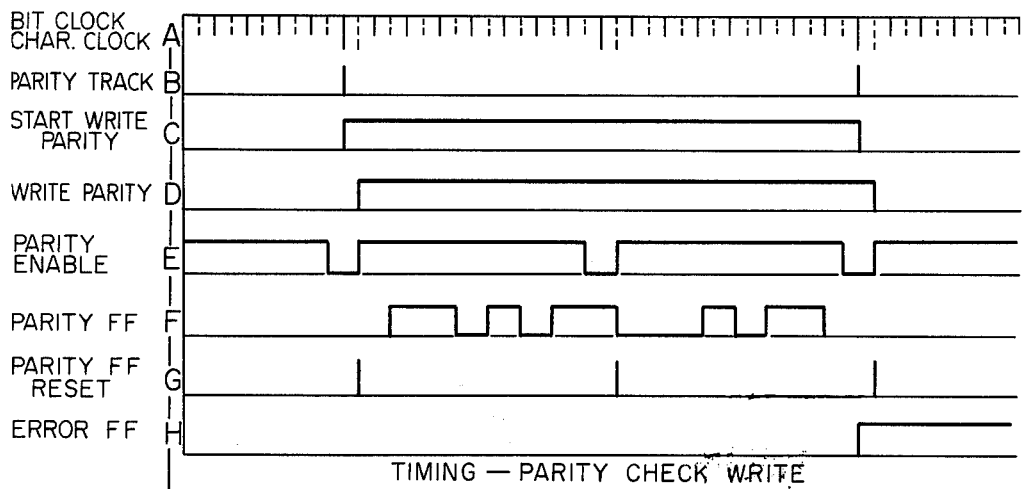

*Parity Check.*—FIGURE 12 is a block diagram of a suitable parity check, while FIGURE 13 shows the timing of the operation of the circuitry.

At the commencement of a write operation, the start write parity flip-flop 131 and the write parity flip-flop 132 are in the reset condition, FIGURES 13C and 13D. Gate 133 controls setting of the flip-flop 131 and has applied thereto a reset signal from the write parity flip-flop 132. When transducer PCMT18 detects a circulating mark in the parity circulating mark channel, FIGURE 13B, a signal is applied to the gate 133. The gate forms an output signal if the write parity flip-flop 132 is in the reset condition and the signal is applied. This signal sets the start write parity flip-flop 131.

(Start Write Parity FF)$_{set}$=(PCM)
(Write Parity FF)$_{reset}$  (32)

A set signal is applied from the start write parity flip-flop to gate 134. Upon application of a character clock plus one-half bit delay to the gate 134, a signal is formed which sets the write parity flip-flop 132.

(Write Parity FF)$_{set}$=(Start Write
Parity FF)$_{set}$ (CC½D)  (33)

A set signal is applied from the write parity flip-flop 132 to the reset gate 136 and to the error gate 137. The set signal is also applied to the write parity gate 138.

As the parity head starts to read written information from the data track, the information is passed by the gate 138 and applied to the binary counter designated generally by the reference numeral 139.

(Data transmitted to Counter)=(Write
Parity FF)$_{set}$ (PT32)  (34)

The binary counter includes parity flip-flop 141 and a transfer circuit 142. Each time a (1) is detected by the parity head, it serves to reverse the state of flip-flop 141 to its other condition, FIGURE 13F. With an even number of input pulses, a signal will appear on the line 143 upon completion of a character. This signal is then applied to the angle 137 along with the character clock and write parity set signal. An output signal is formed and applied to set the error flip-flop 144 on indication of even parity, FIGURE 13H. Since odd parity is used, this indicates an error.

(Error FF)$_{set}$=(Even parity)(Write
Parity FF)$_{set}$ (CC)  (35)

At each character clock delayed one-half bit, FIGURE 13G, the parity flip-flop 141 is reset so that it may check parity for the next character. At the completion of a write operation, a circulating mark is recorded in the circulating mark channel (FIGURE 9) and in the parity circulating mark channel (FIGURE 9). When the parity circulating mark is detected by the head PCMT18, it passes through the reset gate 136 to reset the start write parity flip-flop 131.

(Start Write Parity FF)$_{reset}$
$\qquad$ =(Write Parity)$_{set}$ (PCCM)  (36)

The reset signal from the start write parity flip-flop 131 is passed to the gate 146. Upon application of a character clock plus one-half bit delay, an output signal is generated which resets the write parity flip-flop 132.

(Write Parity FF)$_{reset}$=(Start
$\qquad$ Write Parity)$_{reset}$ (CC½D)  (37)

The equipment is now in readiness to provide a parity check for the next write operation. It is noted that the parity will be continuously checked until the end of a write operation and the recording of a circulating mark.

During a read operation, the parity check is carried out instantaneously by employing the signal from the read head 16 (FIGURE 1) of the data channel. The pulses are applied to the binary counter circuit 139 through a parity read gate 147 which passes the data when the read flip-flop 74 (FIGURE 7) is set.

(Data Transmitted to Counter)
$\qquad$ =(Read FF) (PT16)  (38)

The data is applied to transfer circuit 142 which serves to activate the flip-flop 141 once for each time a (1) occurs. Again, when a signal appears on line 143, it is applied to a gate, in this instance, the gate 148 which will serve to set the error flip-flop when there is present at its input in addition to an indication of even parity, a character clock, a read flip-flop signal and a search flip-flop reset signal.

(Error FF)$_{set}$=(Even Parity)(CC)
$\qquad$ (Read FF)$_{set}$ (Search FF)$_{reset}$  (39)

The error flip-flop can be reset manually or can be reset by a reset command from associated apparatus.

*Stepping motor drive circuit and operation.*—FIGURE 14 shows a suitable stepping motor drive circuit. As previously described, a motor is employed for stepping the data and parity transducers during a write or read operation once for each occurrence of a stepping signal and for stepping the head backwards once for each occurrence of a stepping signal and a backward step or rewind instruction.

A commercial four winding stepping motor is employed to step the transducing head. A motor of this type may, for example, be one known by manufacturer's specification as Superior SS50. Stepping motors of this type are well known in the art and will serve to step either in a forward or reverse direction upon application of pulses having a predetermined sequence.

In the present system, a novel type of drive making use of power flip-flop circuits for energizing the motor windings is employed.

Power flip-flops 151 and 152 are provided. Indicated within these flip-flops are the states (1) and (0) to simplify the description. Transfer circuits 156–159 are connected to receive the output of the flip-flop 151 and direct or transfer the output to the flip-flop 152. Transfer circuits 161–164 are employed for directing or transferring the output from flip-flop 152 to flip-flop 151.

Forward step pulses are applied to the transfer circuits 156, 159, 161 and 164, while reverse step pulses are applied to the transfer circuit gates 157, 158, 162 and 163. Each of the transfer gates provides an output signal to the associated flip-flop when the input flip-flop is in the corresponding (1) or (0) state and there is a forward or backward step command applied. The succeeding flip-flop will be switched only if it is not in the state corresponding to the output signal from the corresponding transfer circuit.

The action of the foregoing circuit is to provide a binary counter which will count up or down and provide proper output signals for driving the motor in a forward or reverse direction, respectively. For example, the two counters might have the following sequence of output signals in response to stepping signals: 0–0, 0–1, 1–0, 1–1. The flip-flop states will then shift in sequence either forward or backward with the foregoing code to provide corresponding output signals. These signals are those required for driving the motor forward or backward depending upon the direction the count is progressing.

In FIGURES 5, 7, 9, 10, 11, 12 and 14, there has been described various circuits for performing the functions of read, write, backward stepping and circulating marker control, parity checking, forward and backward stepping, and motor driving. In FIGURE 15, there is presented a block diagram which indicates the inter-connections between the circuits of the various figures. Within the figures are numbers corresponding to the particular gate or flip-flop from which the signal is derived or to which the signal is applied.

Thus, it is seen that the write circuit, FIGURE 5, provides three output signals; search, circulating marker and write. The search signal is applied to the circuits of FIGURES 9, 11 and 12. The circulating mark signal is applied to the circuit of FIGURE 9. The write signal is applied to the circuits of FIGURES 11 and 12.

The read circuit, FIGURE 7, provides three output signals; search, circulating mark and read. The search information is applied to the circuits of FIGURES 9, 11 and 12. The circulating mark information is applied to the circuit of FIGURE 9. The read information is applied to the circuits of FIGURES 11 and 12. FIGURE 11 provides three output signals, a reference circulating mark, and forward and backward commands applied to the circuit of FIGURE 14. The circuit of FIGURE 12 provides an error signal which is applied to the write and read circuits, FIGURES 5 and 7, and to the forward and backward step circuits, FIGURE 11.

As previously described, a disc type recording medium may be used instead of a belt or drum type rotating recording medium. Referring to FIGURE 16, a suitable disc type apparatus is shown. The reference numerals are the same as those used with respect to FIGURE 1 to identify like parts. The letter "*a*" is added to indicate the modified apparatus. A single clock track is illustrated. Suitable electronics may be employed to give the desired timing information. Alternatively, two clock tracks may be employed in the manner described above to give the desired information.

It should be noted that many of the components described may serve two purposes. For example, much of the write and read electronics is duplicated in the system shown. By employing simple switching circuits, the electronics is duplicated in the system shown. By employing simple switching circuits, the electronics can be considerably reduced. Furthermore, switching circuits might be employed in conjunction with the heads to have them serve more than one purpose. All such modifications and others will be apparent to a person skilled in the art. The circuits presented are merely intended to be illustrative of the invention.

I claim:
1. A data storage system for storing information supplied from associated equipment onto a cyclically moving storage medium including a single continuous record track extending around and advancing by steps extending laterally of the direction of movement of the storage medium to serially receive data in the track, means for writing information bits in said single continuous record track including said steps thereof during a write operation, a circulating mark track having a single mark therein, means for transducing said circulating mark on said circulating mark track, means responsive to said transduced mark on said circulating mark track serving to immediately commence a write operation in the first named track via the first named means, means responsive to the transduced circulating mark for erasing the circulating mark from the circulating mark track to remove the mark from its track during a write operation, and means for immediately writing a new circulating mark on the circulating mark track at a position corresponding directly to that position on the storage medium at which the write operation is completed upon completion of a data transfer operation whereby the information is indexed by the single new circulating mark.

2. A data storage system comprising a continuously rotating storage medium, means for transducing data on said storage medium during a data transfer operation, a circulating mark track, means for transducing a circulating mark on said circulating mark track, means responsive to a transduced mark stored in said circulating mark track serving to control commencement of a data transfer transducing operation, means responsive to the transduced circulating mark for erasing the circulating mark, means for unidirectionally stepping the transducing means in a direction substantially perpendicular to the direction of rotation of the rotating medium, and means serving to step the transducing means during a data transfer transducing operation.

3. A data storage system comprising a continuously rotating storage medium, a data transducer for writing data on said storage medium during a data write operation, a storage track having stored thereon stepping pulses, means for unidirectionally stepping the data transducer perpendicular to the direction of rotation of the storage medium in response to transduced stepping pulses, and means for controlling the transmission of transduced stepping pulses to the data transducer stepping means so that the data transducer is stepped only during a data write operation.

4. A data storage system comprising a continuously rotating storage medium having data stored thereupon, a transducer for reading said data during a data read operation, a storage track having stored thereon stepping pulses, means for unidirectionally stepping the transducer in a direction perpendicular to the direction of rotation of the storage medium in response to stepping pulses, and means serving to control the transmission of stepping pulses to said transducer stepping means so that the transducer is stepped only during a data read operation.

5. A data storage system including a rotating storage medium, an information transducer operatively associated with said recording medium for transducing information on said storage medium, means for unidirectionally stepping said transducer perpendicular to the direction of rotation of said rotating medium, a stepping track having recorded thereon stepping signals, a stepping transducer for reproducing the stepping signals, and means for controlling the application of stepping signals to said stepping means whereby there is formed a plurality of interconnected coaxial circular track portions.

6. A cyclic storage medium adapted to be driven in a predetermined direction and having data serially stored continuously throughout the extent of a track thereon, said track including a plurality of coaxial circular portions with each portion being connected to the adjacent portion by a step, each successive one of said circular portions being progressively offset laterally of said direction in a common direction, and a mark track having a single mark serving to index the serial data.

7. A data storage system comprising a continuously rotating storage medium, a data transducer for transducing data on said storage medium during a data transfer operation, a storage track formed on said rotating storage medium having stored thereon stepping pulses, means for transducing said stepping pulses, means for unidirectional stepping the data transducer perpendicular to the direction of rotation of the storage medium in response to transduced stepping pulses, means for controlling the transmission of transduced stepping pulses to the data transducer moving means so that the transducer is stepped in one direction only during a data transfer operation, and means for stepping the data transducer in the other direction in response to transduced stepping pulses and a rewind instruction.

8. A data storage system comprising a continuously rotating magnetic medium, a single continuous record track extending around and advancing laterally of the record medium to serially receive data in the track, means for magnetically recording and reproducing data on said rotating medium during a data transfer operation, a circulating mark track formed on said medium and having a single mark therein, transducer means for magnetically recording and reproducing said single mark on said circulating mark track, means responsive to said reproduced mark stored on said circulating mark track serving to immediately commence a data transfer operation, means responsive to the reproduced mark for erasing the mark from the circulating mark track, and means operable upon completion of a data transfer operation for forming a new mark and immediately applying the same to the transducer means, said transducer means applying said new mark to the circulating mark track at a position directly corresponding to that position on the rotating medium at which the transfer operation is completed.

9. A data storage system comprising a continuously rotating magnetic storage medium, means for recording and reproducing data from said medium during a data transfer operation, a circulating mark track, means for recording and reproducing a circulating mark on said circulating mark track, means responsive to a reproduced mark stored in said circulating mark track serving to control commencement of a data transfer operation, means responsive to the reproduced mark for erasing the mark from the circulating mark track, means for unidirectionally stepping the data recording and reproducing means in a direction substantially perpendicular to the direction of travel of the rotating medium, and means serving to control the stepping of transducing means so that it steps only during a data transfer transducing operation, and means for storing a new mark on the circulating mark track upon completion of a data transfer operation.

10. A data storage system comprising a continuously rotating storage medium, means for transducing data on said storage medium during a data transfer operation, a circulating mark track, means for transducing a circulating mark on said circulating mark track, means responsive to a transduced mark stored in said circulating mark track serving to control commencement of a data transfer operation, means responsive to the transduced circulating mark for erasing the circulating mark, means for unidirectionally stepping the transducing means in a direction substantially perpendicular to the direction of rotation of the rotating medium, a stepping clock travel having stored therein stepping pulses, the last named means being stepped in response to transduced stored stepping pulses.

11. A data storage system comprising a rotating storage medium, a continuous closed storage track formed on the storage medium, said track having at least one mark recorded thereon, a first transducing means disposed in cooperative relationship with said track to record and reproduce a mark on said track, a second transducing means spaced an amount less than 180° in the direction of rotation of said storage medium along said track and in cooperative relationship therewith, said second transducing means adapted to reproduce said mark in response to a control signal, means for applying said reproduced mark directly to the first transducer to be transduced on the track to form a reproduced mark signal, and means responsive to the reproduced mark for erasing the mark as soon as it is transduced by said second transducing means.

12. A data storage system for operating on digital data including characters composed of a plurality of bits, a continuous closed storage track having at least one bit of information recorded thereon, a first transducing means disposed in cooperative relationship with said track to record and reproduce information on said track, a second transducing means spaced in the direction of rotation of said storage medium a distance equal to 180° less at least one-half character length in degrees in the direction of rotation of the recording medium, said second transducing means adapted to reproduce the information in response to a control signal, means responsive to the reproduction of the information for erasing the information, the reproduced information being applied directly to the first transducing means to be re-recorded on the track, said second transducer serving to transduce the re-recorded information, means responsive to the reproduced re-recorded information for erasing the same, means for temporarily storing the reproduced re-recorded information, and means for applying the stored reproduced re-recorded information to the first transducer in response to a control signal.

13. A data storage system for operating on digital data including characters composed of at least one bit comprising a rotating storage medium, a continuous closed storage track having at least one signal recorded thereon, a first transducing means disposed in cooperative relationship with said track to record and reproduce information on said track, a second transducing means spaced 180° less at least one-half character length in degrees in the direction of rotation of said storage medium along said track and in cooperative relationship therewith, said second transducing means adapted to reproduce a signal on said track in response to a control signal, means responsive to reproduction of the signal for erasing the signal, the reproduced signal being applied directly to the first transducing means to be re-recorded on the track, said second transducer serving to transduce the re-recorded signal, means responsive to the re-recorded signal for erasing the signal, means for temporarily storing the reproduced re-recorded information, at least one clocking track having thereon bit and character clock signals stored on said storage medium, clock transducing means for reproducing said clock signals, and means for applying the stored reproduced re-recorded information to the first transducer in response to a character clock signal.

14. A data storage system including a continuously rotating storage medium, a data transducer disposed in cooperative relationship therewith to write a data track, a second transducer disposed in cooperative relationship with said data track and spaced a predetermined distance in the direction of rotation of the storage medium from the first transducer to reproduce data written by the first transducer, an error checking circuit adapted to receive data from the second transducer and perform an error checking operation, an error checking control track, a first control transducer disposed in cooperative relationship with said track, a second control transducer disposed in cooperative relationship with said track and spaced said predetermined distance in the direction of rotation of the medium from the first control transducer, means for applying a signal to said first control transducer for recording a control mark on said track when a write operation commences, means responsive to a signal generated by the second transducer in response to the mark laid down by the first transducer to commence an error checking operation, means responsive to detection of the mark by said second control transducer for erasing the mark, means for recording another mark on said channel when the write operation is completed, means responsive to a signal generated by the second control transducer in response to the said other mark serving to stop the error checking operation, and means responsive to said signal for erasing said other mark.

15. A data storage system including a continuously rotating storage medium, a data transducer disposed in cooperative relationship therewith to write a data track, a second transducer disposed in cooperative relationship with said data track and spaced a predetermined distance in the direction of rotation of the rotating medium from the first transducer to reproduce data written by the first transducer, an error checking control track, a first control transducer disposed in cooperative relationship with said control track, a second control transducer disposed in cooperative relationship with said control track and spaced said predetermined distance in the direction of rotation from the first control transducer to reproduce the mark, a circulating mark track, a circulating mark transducer disposed in cooperative relationship with said circulating mark track to transduce signals thereon, means responsive to a circulating mark reproduced by said circulating mark transducer for controlling transmission of data to said data transducer, means responsive to a reproduced circulating mark for erasing the mark in the circulating mark track, means responsive to the reproduced mark for applying a mark to the first control transducer to record a mark on said control track, means responsive to detection of the control mark by the second control transducer to form an error checking signal, an error checking circuit adapted to receive said error checking signal and commence an error checking operation of data read by the second transducer, means responsive to reproduction of the control mark by the second control transducer for erasing the same, means responsive to completion of a write operation for recording a circulating mark in the circulating mark channel, means responsive to completion of a write operation for writing a mark in said error control track by the first transducer, means responsive to the detection of said last mentioned mark by said second control transducer for terminating the error checking operation, and means responsive to the reproduced last mentioned mark for erasing the same whereby there is no mark present in said error control track.

16. A data storage system for operating on digital data including characters composed of a plurality of bits, a continuously rotating storage medium, a data transducer disposed in cooperative relationship to said storage medium to transduce data thereon during a data transfer operation, a storage track having recorded thereon stepping pulses, a stepping pulse transducer disposed in cooperative relationship with the storage track, means for unidirectionally stepping the data transducer perpendicular to the direction of rotation of the storage medium in response to transduced stepping pulses, means for controlling the transmission of transduced stepping pulses to the data transducer stepping means so that data transducers step only during a data transfer operation, a circulating mark track having at least one mark recorded thereon, a first transducer means disposed in cooperative relationship with said circulating mark track to record and reproduce a circulating mark on said track, a second transducer means spaced 180° less at least one-half character length in the direction of rotation of said storage medium along said circulating mark track and in cooperative relationship therewith, said second transducer means in response to a control signal serving to read the mark written by the first transducer to form a mark signal, means responsive to the read mark signal for erasing the mark, means for storing said read mark, and means for applying the stored read mark in timed sequence to the first transducing means to record a new mark in the storage track, and means for applying stepping pulses to the said stepping means to step the data transducer in a reverse direction if a stepping pulse occurs during said mark transfer operation.

(References on following page)

References Cited by the Examiner

UNITED STATES PATENTS

| | | |
|---|---|---|
| 2,587,532 | 2/1952 | Schmidt. |
| 2,614,169 | 10/1952 | Cohen et al. _____ 340—174.1 |
| 2,680,239 | 6/1954 | Daniels et al. _____ 340—174.1 |
| 2,782,398 | 2/1957 | West et al. _____ 340—174.1 |
| 2,797,402 | 6/1957 | Duffey _____ 340—174.1 |
| 2,863,134 | 12/1958 | Buchholz et al. ____ 340—174.1 |
| 2,901,550 | 8/1959 | Brasseur _____ 179—100.2 |
| 2,923,922 | 2/1960 | Blickensderfer _____ 340—174.1 |
| 2,932,010 | 4/1960 | Mayer et al. _____ 340—174.1 |
| 2,991,460 | 7/1961 | Hill _____ 340—174.1 X |
| 3,007,144 | 10/1961 | Hagopian _____ 340—174.1 |

IRVING L. SRAGOW, *Primary Examiner.*